United States Patent
Chen et al.

(10) Patent No.: US 9,467,044 B2
(45) Date of Patent: Oct. 11, 2016

(54) TIMING GENERATOR AND TIMING SIGNAL GENERATION METHOD FOR POWER CONVERTER

(71) Applicant: uPI Semiconductor Corp., Hsinchu County (TW)

(72) Inventors: Ya-Ping Chen, Hsinchu County (TW); Wei-Ling Chen, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 38 days.

(21) Appl. No.: 14/251,658

(22) Filed: Apr. 14, 2014

(65) Prior Publication Data

US 2014/0340066 A1 Nov. 20, 2014

(30) Foreign Application Priority Data

May 16, 2013 (TW) .............................. 102117405 A

(51) Int. Cl.
*H02M 3/156* (2006.01)
(52) U.S. Cl.
CPC ........... *H02M 3/156* (2013.01); *H02M 3/1563* (2013.01); *H02M 2003/1566* (2013.01)
(58) Field of Classification Search
CPC ............. H02M 3/158; H02M 3/1588; H02M 3/1582; H02M 2001/0045; H02M 2001/0067; H02M 3/156; H02M 2003/1566; H02M 3/155; H02M 2003/1557; H02M 3/157; H02M 2001/0012; H02M 3/1563; H02M 2001/00; H04B 2215/069
USPC ......................................... 323/280–289, 271
See application file for complete search history.

(56) References Cited

U.S. PATENT DOCUMENTS

| | | | |
|---|---|---|---|
| 6,791,306 B2 | 9/2004 | Walters et al. | |
| 6,839,252 B2 | 1/2005 | Tai et al. | |
| 6,922,044 B2 | 7/2005 | Walters et al. | |
| 7,019,502 B2 | 3/2006 | Walters et al. | |
| 7,132,820 B2 * | 11/2006 | Walters et al. | ............... 323/288 |
| 7,545,134 B2 * | 6/2009 | Harriman | ............ H02M 3/1588 323/271 |

(Continued)

FOREIGN PATENT DOCUMENTS

| | | |
|---|---|---|
| TW | I234058 | 6/2005 |
| TW | 200921317 | 5/2009 |
| TW | 201315106 | 4/2013 |

OTHER PUBLICATIONS

"Office Action of Taiwan Counterpart Application", issued on Oct. 23, 2014, p.1-p.7, in which the listed references were cited.

*Primary Examiner* — Timothy J Dole
*Assistant Examiner* — Bryan R Perez
(74) *Attorney, Agent, or Firm* — Jianq Chyun IP Office

(57) ABSTRACT

A timing generator for a power converter is provided. The timing generator includes a threshold voltage generation circuit and a timing generation unit. The threshold voltage generation circuit receives an error signal related to an output voltage of the power converter. The threshold voltage generation circuit generates a threshold voltage according to the error signal. The timing generation unit generates a timing signal according to the error signal, the threshold voltage and a control signal. The timing generation unit provides a tracking signal. A width of the timing signal depends on a time when tracking signal departed from a level of the error signal to a level of the threshold voltage. The present invention also provides a timing signal generation method for the power converter.

12 Claims, 4 Drawing Sheets

(56) References Cited

U.S. PATENT DOCUMENTS

| | | |
|---|---|---|
| 8,148,967 B2 | 4/2012 | Xing et al. |
| RE43,414 E | 5/2012 | Walters et al. |
| 8,174,250 B2* | 5/2012 | Wu et al. ............... 323/271 |
| 2007/0013356 A1 | 1/2007 | Qiu et al. |
| 2008/0030181 A1* | 2/2008 | Liu et al. ............... 323/283 |
| 2009/0033310 A1* | 2/2009 | Erbito, Jr. ............... 323/313 |
| 2010/0301825 A1* | 12/2010 | Yamaguchi ......... H02M 3/1588 323/284 |
| 2011/0227549 A1* | 9/2011 | Huang et al. ............ 323/282 |
| 2012/0112721 A1 | 5/2012 | Wu et al. |
| 2013/0038236 A1* | 2/2013 | Mitarashi ............... 315/240 |

* cited by examiner

US 9,467,044 B2

TIMING GENERATOR AND TIMING SIGNAL GENERATION METHOD FOR POWER CONVERTER

CROSS-REFERENCE TO RELATED APPLICATION

This application claims the priority benefit of Taiwan application serial no. 102117405, filed on May 16, 2013. The entirety of the above-mentioned patent application is hereby incorporated by reference herein and made a part of this specification.

BACKGROUND OF THE INVENTION

1. Field of the Invention

The present invention is directed to a power converter and more particularly, to a timing generator and a timing signal generation method for a power converter.

2. Description of Related Art

A DC-DC power supply design nowadays usually adopts a constant on time (COT) architecture. FIG. 1 is a schematic diagram illustrating a power converter 100 based on the COT architecture in the related art. A comparator 110 generates a compared signal CM by comparing an error signal Err with a ramp signal RAMP. A magnitude of the error signal Err is related to both a feedback signal Vfb and a reference voltage Vref. A timing control circuit 120 provides a pulse width modulation signal PWM according a constant on time mechanism and the compared signal CM, in which a width of an On-time Ton is related to an input voltage Vin and an output voltage Vout.

FIG. 2 is a schematic diagram illustrating the waveforms generated in the power converter 100. Referring to FIG. 1 with FIG. 2, the pulse width modulation signal PWM is decided by the error signal Err and the ramp signal RAMP. Meanwhile, when the compared signal CM triggers the timing control circuit 120, the timing control circuit 120 starts to count a fixed On-time Ton of each period in the pulse width modulation signal PWM. However, despite that a conventional pulse width modulation operation architecture may achieve a fixed frequency effect, when the output voltage Vout is changed with variation of a load current Iload, the timing control circuit 120 is still providing the same energy with the fixed frequency within one period, which results in that a power converter 100 to exhibit a poor performance during a load transient period.

SUMMARY OF THE INVENTION

Accordingly, the invention is directed to a timing generator and a timing signal generation method adapted for a power converter so as to resolve the aforementioned issues.

The invention provides a timing generator for regulating an output voltage of a power converter. The timing generator includes a threshold voltage generation circuit and a timing generation unit. The threshold voltage generation circuit receives an error signal related to the output voltage of the power converter and generates a threshold voltage according to the error signal. The timing generation unit is coupled to the threshold voltage generation circuit and generates a timing signal according to the error signal, the threshold voltage and a control signal. The timing generation unit provides a tracking signal. A width of the timing signal depends on a time when the tracking signal departs from a level of the error signal to a level of the threshold voltage.

In an embodiment of the invention, the control signal is a comparing result from a first comparator of the power converter, and the first comparator receives the error signal and a ramp signal.

In an embodiment of the invention, the threshold voltage generation circuit includes a first current source and a resistor. The threshold voltage generation circuit generates a predetermined voltage by using the first current source and the resistor. The threshold voltage is an operating result from the predetermined voltage and the error signal.

In an embodiment of the invention, the threshold voltage generation circuit includes a first current source, a resistor and a first amplifier. A first input terminal of the first amplifier receives the error signal, a second input terminal of the first amplifier is coupled to an output terminal of the first amplifier, an output terminal and the second input terminal of the first amplifier are coupled to one terminal of the resistor, and the other terminal of the resistor is coupled to the first current source.

In an embodiment of the invention, a relationship between the threshold voltage and the error signal is expressed as:

$$V1 = Err + Vw,$$

where V1 represents the threshold voltage, Err represents the error signal, and Vw represents a predetermined voltage.

In an embodiment of the invention, the timing generation unit includes a second comparator and a control circuit. A first input terminal and a second input terminal of the second comparator respectively receives the threshold voltage and the tracking signal to control the control circuit to generate the timing signal.

In an embodiment of the invention, the control circuit includes a first switch, a capacitor, a second switch and a second current source. A first terminal of the first switch is coupled to the second input terminal of the second comparator, and a second terminal thereof is coupled to the threshold voltage generation circuit. The capacitor is coupled between a first node and a ground terminal. The control terminal of the second switch receives the timing signal, and a first terminal thereof is coupled to the second input terminal of the second comparator and the capacitor through the first node. The second current source is coupled between the second terminal of the second switch and an operating voltage.

In an embodiment of the invention, control circuit further includes a third switch, a fourth switch, a first inverter, a second inverter and a third inverter. The control terminal of the third switch receives a control signal, a first terminal thereof is coupled to the ground terminal, and a second terminal thereof is coupled to the control terminal of the first switch. The input terminal of the first inverter is coupled to the second terminal of the third switch. An input terminal of the second inverter is coupled to the output terminal of the first inverter, and an output terminal thereof is coupled to the input terminal of the first inverter. A control terminal of the fourth switch is coupled to the output terminal of the second comparator to receive a reset signal, a first terminal thereof is coupled to the ground terminal, and a second terminal thereof is coupled to the output terminal of the first inverter and the input terminal of the second inverter. An input terminal of the third inverter is coupled to the input terminal of the first inverter, the output terminal of the second inverter and the second terminal of the third switch, and an output terminal thereof is coupled to the control terminal of the second switch and generates the timing signal.

In an embodiment of the invention, an output current of the first current source is related to a magnitude of the output voltage. An output current of the second current source is related to a magnitude of an input voltage of the power converter.

The invention provides a timing signal generation method for a power converter. The timing signal generation method includes steps as follows: receiving an error signal related to an output voltage of the power converter, generating a threshold voltage according to the error signal and generating a timing signal according to the error signal, the threshold voltage and a control signal and providing a tracking signal. A width of the timing signal depends on a time when the tracking signal departs from a level of the error signal to a level of the threshold voltage.

In an embodiment of the invention, the step of generating the timing signal according to the error signal, the threshold voltage and the control signal includes the first comparator receiving the error signal and a ramp signal, wherein the control signal is a comparing result from a first comparator of the power converter.

In an embodiment of the invention, the step of generating the threshold voltage according to the error signal includes generating a predetermined voltage by using a first current source and a resistor, and the threshold voltage is an operating result from the predetermined voltage and the error signal.

Based on above, the timing generator of the invention utilizes the error signal related to the output voltage power converter to generate the threshold voltage and then, generates a timing signal according to the error signal, the threshold voltage and the control signal. The timing signal is utilized to adjust a width of ON-time of a high side switch in an output stage, or to adjust a width of OFF-time of a high side switch in an output stage. During a load transient period, since the timing signal provided by the timing generator may effectively converge the output voltage, the output voltage may be stabilized and duration of oscillation can be reduced, so as to solve the problem as mentioned in Description of Related Art.

However, the above descriptions and the below embodiments are only used for explanation, and they do not limit the scope of the present invention.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
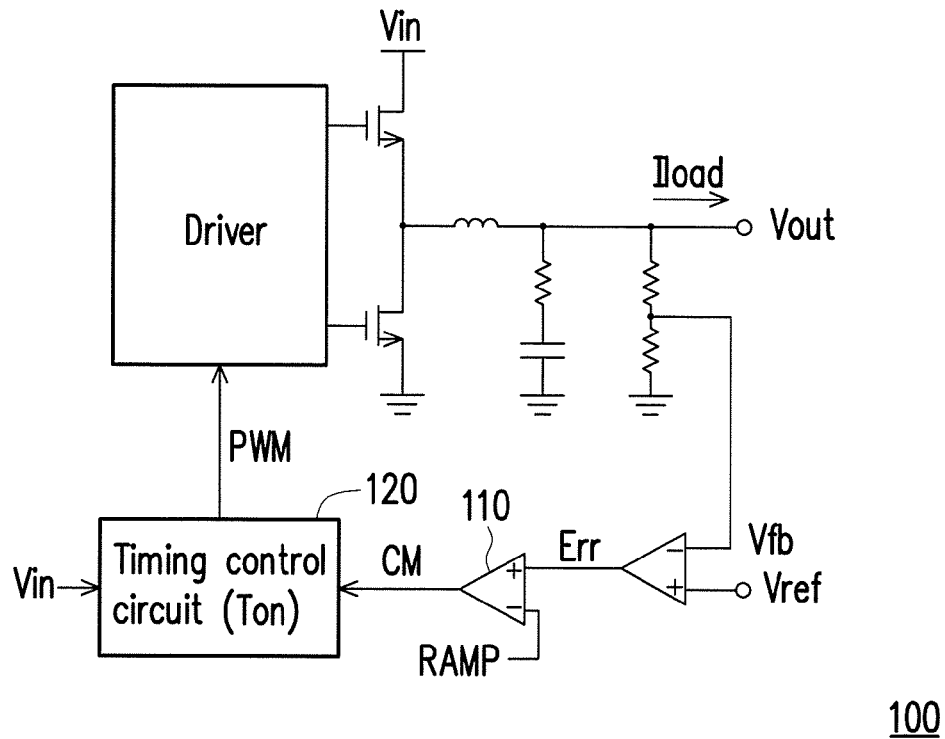
FIG. 1 is a schematic diagram illustrating a power converter based on a constant on time (COT) architecture in the related art.
Figure 2:
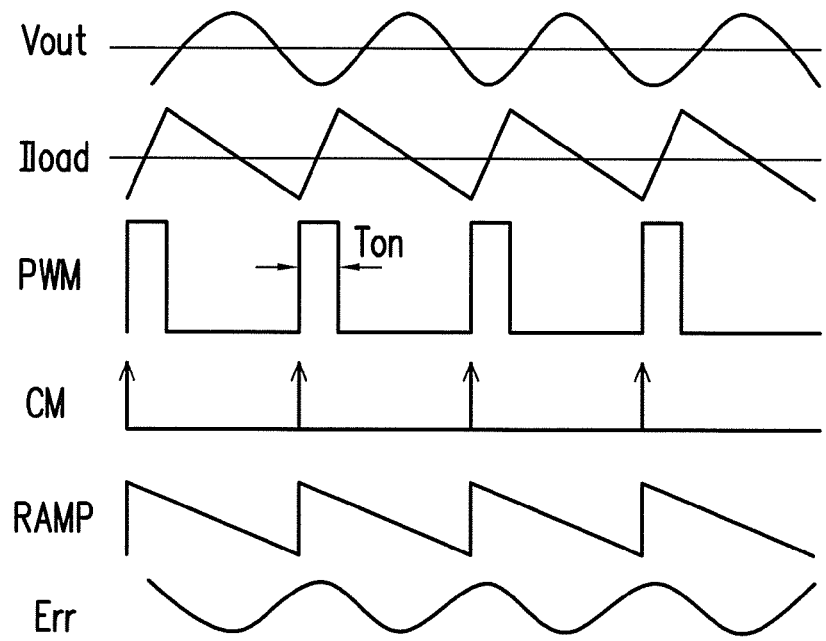
FIG. 2 is a schematic diagram illustrating the waveforms generated in the power converter.

Reference will now be made in detail to the exemplary embodiments of the disclosure, examples of which are illustrated in the accompanying drawings. Moreover, elements/components with same reference numerals represent same or similar parts in the drawings and embodiments.

In the embodiments provide as below, when an element is described as "connected to" or "coupled to" another element, the element should be construed as either directly connected to or coupled to the another element, or there may be one or more other element existing between the element and the another element. The term "a circuit" represents at least one or a plurality of elements that are actively and/or inactively coupled to provide a suitable function. The term "a signal" represents at least one of a current, a voltage, a load, a temperature, data or any other type of signal. A ramp signal can be a ramp-like signal, a triangular wave signal or a sawtooth signal, which can be a repeat-declining slope or a repeat-inclining slope, depending on actual application.

Figure 3:
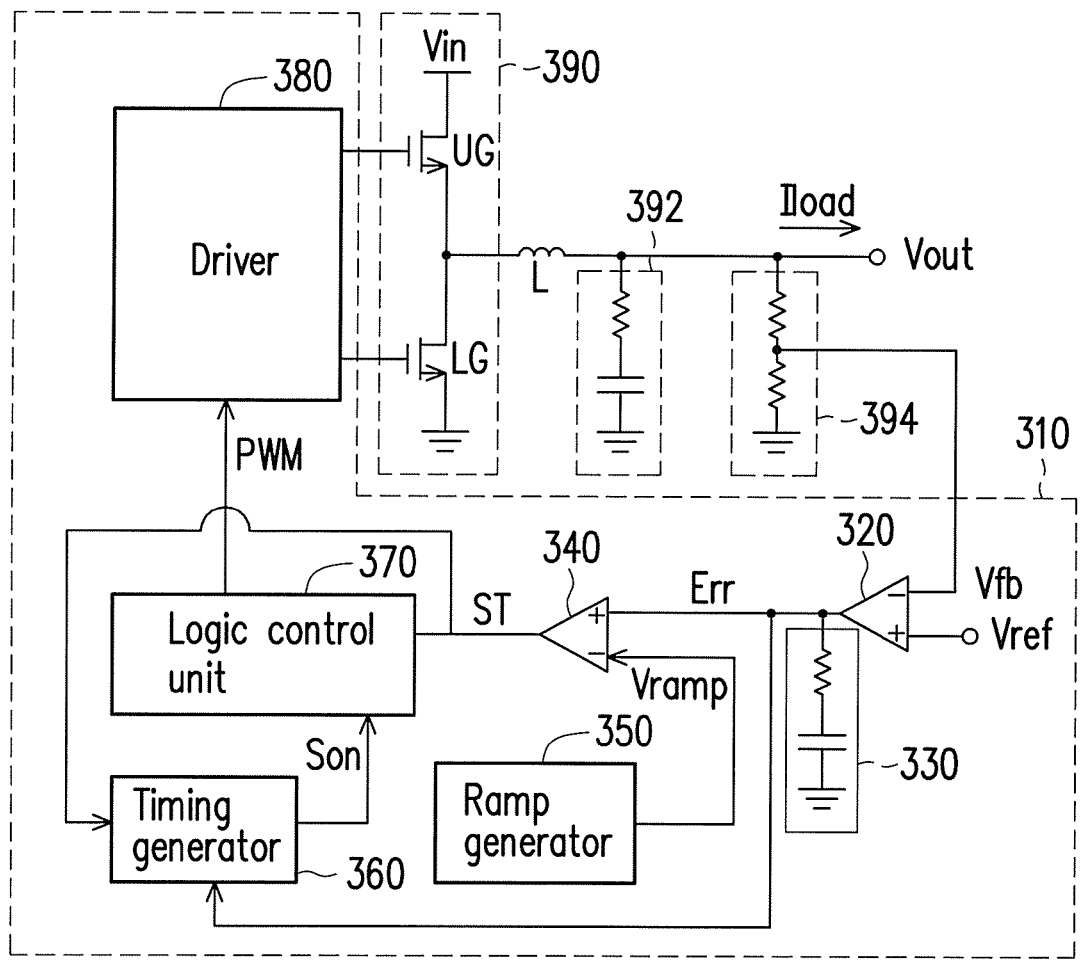
FIG. 3 is a structural schematic diagram illustrating a power converter according to an embodiment of the present invention.

FIG. 3 is a structural schematic diagram illustrating a power converter according to an embodiment of the present invention. Referring to FIG. 3, a power converter 300 includes a DC-DC controller 310, an output stage 390, an inductor L, a regulator circuit 392 and a feedback circuit 394.

The DC-DC controller 310 includes an amplifier 320, a compensation circuit 330, a comparator 340, a ramp generator 350, a timing generator 360, a logic control unit 370 and a driver 380. A feedback signal Vfb is a proportional signal of an output voltage Vout. The amplifier 320 may be an error amplifier or a transconductance amplifier. The amplifier 320 generates an error signal Err according to a reference voltage Vref and the feedback signal Vfb. The compensation circuit 330 is used for compensating and stabilizing the error signal Err. The ramp generator 350 is used to generate a ramp signal Vramp.

The comparator 340 compares the ramp signal Vramp with the error signal Err to generate a control signal ST. The comparator 340 outputs the control signal ST to the logic control unit 370 and the timing generator 360. The logic control unit 370 provides a pulse width modulation signal PWM to the driver 380 according to the control signal ST and a timing signal Son. The driver 380 drives the output stage 390 according to the pulse width modulation signal PWM so as to control a high side switch UG and a low side switch LG in the output stage 390. The output stage 390 is used to perform a DC-DC conversion on an input voltage Vin, such that the power converter 300 generates and outputs an output voltage Vout. In addition, when a load current Iload is transient, the output voltage Vout is then changed accordingly.

Figure 4:
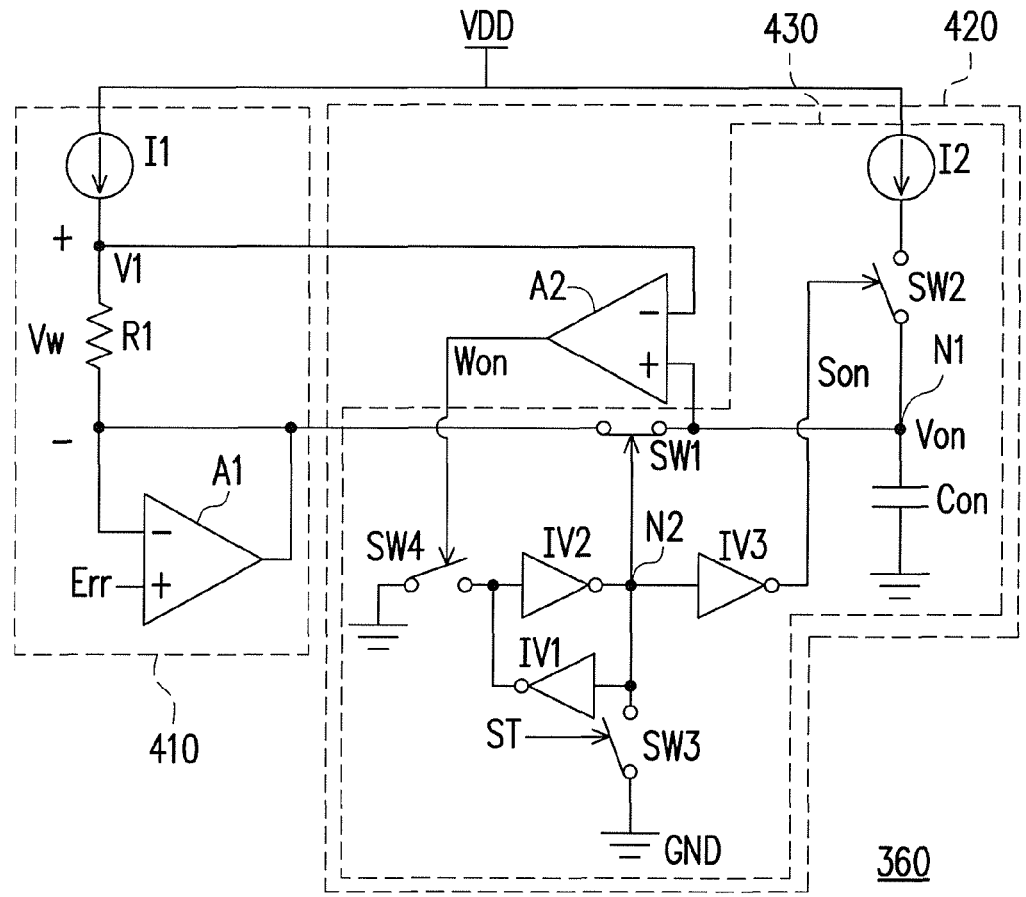
FIG. 4 is a schematic diagram illustrating a circuitry of the timing generator according to an embodiment of the present invention.

FIG. 4 is a schematic diagram illustrating a circuitry of the timing generator 360 according to an embodiment of the present invention. Referring to FIG. 3 with FIG. 4, the timing generator 360 may regulate the output voltage Vout in the power converter 300. The timing generator 360 includes a threshold voltage generation circuit 410 and a timing generation unit 420. The timing generation unit 420 is coupled to the threshold voltage generation circuit 410.

In the present embodiment, the error signal Err is related to the output voltage Vout of the power converter 300. The threshold voltage generation circuit 410 receives the error signal Err and generates a threshold voltage V1 according to the error signal Err. The timing generation unit 420 generates the timing signal Son according to the error signal Err, the threshold voltage V1 and the control signal ST. The timing generation unit 420 further provides a tracking signal Von. The timing signal Son generated by the timing generation unit 420 may be used to control a turning-on/turning-off time of the high side switch UG or low side switch LG in the output stage 390.

Figure 5:
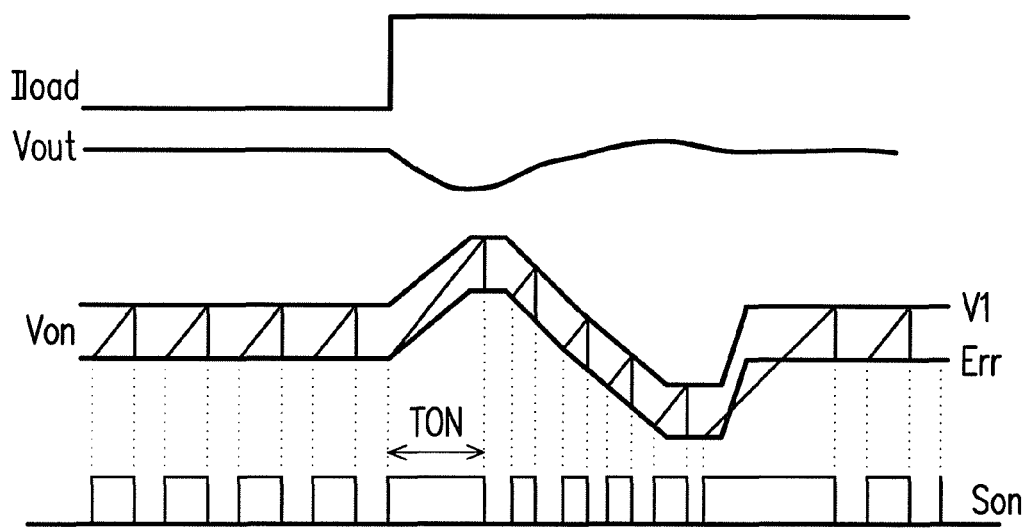
FIG. 5 is a schematic diagram illustrating waveforms of the timing generator.

Additionally, with reference to the illustration of FIG. 5, a width of the timing signal Son depends on a time when the tracking signal Von departs from a level of the error signal Err to a level of the threshold voltage V1.

The threshold voltage generation circuit 410 includes a first current source I1 and a resistor R1. The threshold voltage generation circuit 410 generates a predetermined voltage Vw by using the first current source I1 and the resistor R1. The threshold voltage V1 is an operation result from the predetermined voltage Vw and the error signal Err. A relationship between the threshold voltage V1 and the error signal Err is expressed as:

$$V1=Err+Vw.$$

To be more specific, the threshold voltage generation circuit 410 further includes an amplifier A1. The amplifier A1 adopts a negative feedback control operation. A second (inverting) input terminal of the amplifier A1 is coupled to the output terminal thereof, and a first (non-inverting) input terminal of the amplifier A1 is coupled to an output terminal of the amplifier 320 to receive the error signal Err. A first terminal of the resistor R1 is coupled to an output terminal of the amplifier A1. A current source I1 is coupled between a second terminal of the resistor R1 and an operating voltage VDD.

In the present embodiment, the threshold voltage generation circuit 410 generates the threshold voltage V1 at a position where the resistor R1 is coupled to the current source I1. According to a current direction of the current source I1, a voltage level of the threshold voltage V1 is equal to a voltage of the error signal Err plus the predetermined voltage Vw at two terminals of the resistor R1, i.e., V1=Err+I1×R1=Err+Vw, where the predetermined voltage Vw may be selected according to a designing demand (i.e., a designer may select an expected resistance value for the resistor R1 according to his/her demand), but the present invention is not limited thereto.

The timing generation unit 420 includes a comparator A2 and a control circuit 430. A first input terminal and a second input terminal of the comparator A2 respectively receives the threshold voltage V1 and the tracking signal Von to control the control circuit 430 to generate the timing signal Son. The control circuit 430 includes a switch SW1, a capacitor Con, a switch SW2 and a current source I2. A first terminal of the switch SW1 is coupled to the second input terminal of the comparator A2, and a second terminal thereof is coupled to the threshold voltage generation circuit 410. The capacitor Con is coupled between a first node N1 and a ground terminal GND. A control terminal of the switch SW2 receives the timing signal Son and a first terminal thereof is coupled to the second input terminal of the comparator A2 and the capacitor Con through the first node N1. The current source I2 is coupled between a second terminal of the switch SW2 and an operating voltage VDD.

Moreover, the control circuit 430 further includes switches SW3-SW4 and inverters IV1-IV3. A control terminal of the switch SW3 receives the control signal ST, a first terminal thereof is coupled to the ground terminal GND, and a second terminal thereof is coupled to the control terminal of the switch SW1. An input terminal of the inverter IV1 is coupled to the second terminal of the switch SW3. An input terminal of the inverter IV2 is coupled to an output terminal of the inverter IV1, and an output terminal of the inverter IV2 is coupled to the input terminal of the inverter IV1. A control terminal of the switch SW4 is coupled to an output terminal of the comparator A2 to receive a reset signal Won, a first terminal thereof is coupled to the ground terminal GND, and a second terminal thereof is coupled to the output terminal of the inverter IV1 and the input terminal of the inverter IV2. An input terminal of the inverter IV3 is coupled to the input terminal of the inverter IV1, the output terminal of the inverter IV2 and the second terminal of the switch SW3, and an output terminal of the inverter IV3 is coupled to the control terminal of the switch SW2 and generates the timing signal Son.

In the present embodiment, if it is assumed that the ramp signal Vramp is a repeat-inclining slope and when the error signal Err is greater than the ramp signal Vramp, the switch SW3 is turned on in response to the control signal ST, such that the ground terminal GND is coupled to the switch SW1 to turn off the switch SW1. In the meantime, a voltage level of a second node N2 is latched at a low voltage level by the inverter IV1 and the inverter IV2, such that the inverter IV3 outputs the timing signal Son at a high voltage level in response to the voltage on the second node N2 to turn on the switch SW2. During the period of the switch SW2 being turned on, the capacitor Con starts to be charged from a voltage level locked by the inverting input terminal of the comparator A2, such that a voltage of the tracking signal Von on the first node N1 is gradually increased, wherein a charging current is I2. In other words, a voltage level referenced by the second input terminal of the comparator A2 is the tracking signal Von on the first node N1. On the other hand, a voltage level (i.e., the threshold voltage V1) referenced by the first input terminal of the comparator A2 is a result locked by a negative feedback of the error signal Err through the amplifier A1 plus the predetermined voltage Vw, i.e., V1=Err+Vw.

When the tracking signal Von on the first node N1 reaches the voltage level of the threshold voltage V1, the switch SW4 is turned on by the reset signal Won based on a voltage difference between the tracking signal Von and the threshold voltage V1. Thus, the switch SW1 is turned on in response to the voltage level on the second node N2, and the switch SW2 is turned off in response to the timing signal Son at the low voltage level, and namely, the capacitor Con is discharged through a discharge path from the first node N1 to the second input terminal of the amplifier A1. As a result, the tracking signal Von on the first node N1 is clamped at the voltage level of the error signal Err.

It is to be noted that in the present embodiment, output currents of the current source I1 and the current source I2 are respectively related to the levels of the output voltage Vout and the input voltage Vin. However, in other embodiment, the current source I1 and the current source I2 may also be independent constant current sources, and the present invention is not limited thereto.

FIG. 5 is a schematic diagram illustrating waveforms of the timing generator 360. Referring to FIG. 4 with FIG. 5, a waveform of the error signal Err is different from a waveform of the threshold voltage V1 for a predetermined voltage Vw, i.e., V1=Err+Vw. A voltage difference interval of the timing generation unit 420 that is formed between the error signal Err and the threshold voltage V1 may be represented by {Err to Err+Vw}. Meanwhile, within the voltage difference interval {Err to Err+Vw}, the timing generation unit 420 charges/discharges the capacitor Con. Since the error signal Err is related to the voltage level of the output voltage Vout, upper and lower margins of the voltage difference interval {Err to Err+Vw} vary with the change of the output voltage Vout when the voltage level of the output voltage Vout is changed due to a load transient. In the situation where the current source I2 is a constant current source, a time for charging the node N1 (i.e., a time for the tracking signal Von rising from the voltage level of the error signal Err to the voltage level of the threshold voltage V1) varies with the change of the voltage difference interval {Err to Err+Vw}. In other words, the tracking signal Von of the node N1 varies with the change of the output voltage Vout.

For instance, when the load transient occurs and results in the output voltage Vout being lower than a specific predetermined voltage, the upper and the lower margins of the voltage difference interval {Err to Err+Vw} are increased corresponding to the reduction of the output voltage Vout, and thus, the timing generation unit 420 prolongs a turning-on time TON of the timing signal Son outputted by the inverter IV3 when the output voltage Vout is lower than the specific predetermined voltage (i.e., by prolonging a turning-on time of the high side switch or by relatively shortening a turning-on time of the low side switch). In contrary, when the load transient occurs and so as to result in the output voltage Vout being higher than the specific predetermined voltage, the upper and the lower margins of the voltage difference interval {Err to Err+Vw} are reduced corresponding to the increase of the output voltage Vout, and thus, the timing generation unit 420 shortens the turning-on time TON of the timing signal Son outputted by the inverter IV3 when the output voltage Vout is higher than the specific predetermined voltage (i.e., by shortening the turning-on time of the high side switch or by relatively prolonging the turning-on time of the low side switch).

In other words, the timing signal Son may be used to control the turning-on/turning-off time of the switches of the output stage. When a transient occurs in the load current, the timing signal Son may first increase a pulse width of the pulse width modulation signal PWM (shown in FIG. 3) corresponding to the change of the output voltage and adaptively reduce the pulse width when the output voltage Vout gradually has sufficient energy. Thereby, the DC-DC controller may adaptively adjust the pulse width of the pulse width modulation signal PWM according to the timing signal Son so as to regulate the output voltage Vout.

Figure 6:
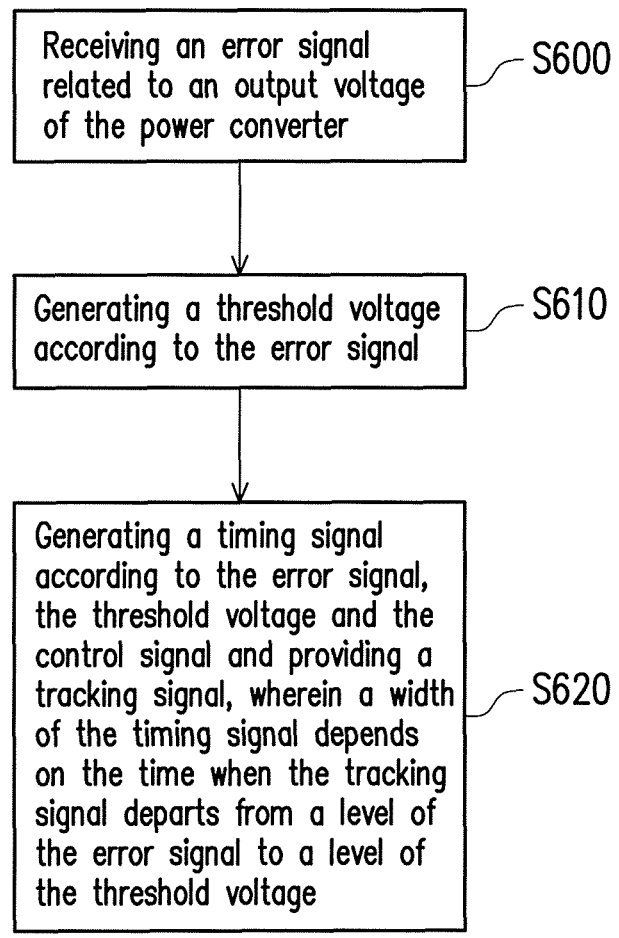
FIG. 6 is a flowchart illustrating a timing signal generation method according to an embodiment of the present invention.

Based on the description related to the aforementioned embodiments, a timing signal generation method may be summarized. More specifically, FIG. 6 is a flowchart illustrating a timing signal generation method according to an embodiment of the present invention. Referring to FIG. 4 and FIG. 6, the timing signal generation method of the present embodiment is adapted for the power converter 300 to regulate the output voltage and includes the following steps:

receiving an error signal Err related to an output voltage Vout of the power converter 300 (step S600);

generating a threshold voltage V1 according to the error signal Err (step S610); and generating a timing signal Son according to the error signal Err, the threshold voltage V1 and a control signal ST and providing a tracking signal Von, wherein a width of the timing signal Son depends on the time when the tracking signal Von departs from a level of the error signal Err to a level of the threshold voltage V1 (step S620).

In light of the foregoing, the timing generator of the present invention utilizes the error signal related to the output voltage of the power converter to generate the threshold voltage and then, generates the timing signal according to the error signal, the threshold voltage and the control signal. The timing signal may be utilized to adjust the turning-on time widths of the high side switch in the output stage, or adjust the turning-off time widths of the high side switch in the output stage. Since the timing signal provided by the timing generator facilitates in effectively accelerating the convergence of the output voltage when the load transient occurs, the output voltage may be stabilized, and the oscillation time may be shortened to resolve the issues in the related art.

Although the invention has been described with reference to the above embodiments, it will be apparent to one of ordinary skill in the art that modifications to the described embodiment may be made without departing from the spirit of the invention. Accordingly, the scope of the invention will be defined by the attached claims not by the above detailed descriptions.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention.

What is claimed is:

1. A timing generator for a power converter, comprising:
   a threshold voltage generation circuit, receiving an error signal related to an output voltage of the power converter and generating a threshold voltage by adding a predetermined voltage to the error signal; and
   a timing generation unit, coupled to the threshold voltage generation circuit and generating a timing signal according to the error signal, the threshold voltage and a control signal,
   wherein a voltage difference interval is formed between the error signal and the threshold voltage, and an upper margin of the voltage difference interval and a lower margin of the voltage difference interval vary with a change of the output voltage,
   wherein the timing generation unit provides a tracking signal and a change of the voltage difference interval, a time when the tracking signal departs from a level of the error signal to a level of the threshold voltage determines a width of the timing signal, and the width of the timing signal is adjusted according to the voltage difference interval and the tracking signal which are varied with the change of the output voltage.

2. The timing generator according to claim 1, wherein the control signal is a comparing result from a first comparator of the power converter, and the first comparator receives the error signal and a ramp signal.

3. The timing generator according to claim 1, wherein the threshold voltage generation circuit comprises a first current source and a resistor, the threshold voltage generation circuit generates the predetermined voltage by using the first current source and the resistor.

4. The timing generator according to claim 1, wherein the threshold voltage generation circuit comprises a first current source, a resistor and a first amplifier, a first input terminal of the first amplifier receives the error signal, a second input terminal of the first amplifier is coupled to an output terminal of the first amplifier, an output terminal and the second input terminal of the first amplifier are coupled to one terminal of the resistor, and the other terminal of the resistor is coupled to the first current source.

5. The timing generator according to claim 4, wherein an output current of the first current source is related to a magnitude of the output voltage.

6. The timing generator according to claim 1, wherein the timing generation unit comprises a second comparator and a control circuit, a first input terminal and a second input terminal of the second comparator respectively receives the threshold voltage and the tracking signal to control the control circuit to generate the timing signal.

7. The timing generator according to claim 6, wherein the control circuit comprises:
   a first switch, having a first terminal coupled to the second input terminal of the second comparator and a second terminal coupled to the threshold voltage generation circuit;
   a capacitor, coupled between a first node and a ground terminal;
   a second switch, having a control terminal receiving the timing signal and a first terminal coupled to the second input terminal of the second comparator and the capacitor through the first node; and
   a second current source, coupled between the second terminal of the second switch and an operating voltage.

8. The timing generator according to claim 7, wherein the control circuit further comprises:
   a third switch, having a control terminal receiving a control signal, a first terminal coupled to the ground terminal and a second terminal coupled to control terminal of the first switch;
   a first inverter, having an input terminal coupled to the second terminal of the third switch;
   a second inverter, having an input terminal coupled to the output terminal of the first inverter and an output terminal coupled to the input terminal of the first inverter;
   a fourth switch, having a control terminal coupled to the output terminal of the second comparator to receive a reset signal, a first terminal coupled to the ground terminal, and a second terminal coupled to the output terminal of the first inverter and the input terminal of the second inverter; and
   a third inverter, having an input terminal coupled to the input terminal of the first inverter, the output terminal of the second inverter and the second terminal of the third switch, and an output terminal coupled to the control terminal of the second switch and generating the timing signal.

9. The timing generator according to claim 7, wherein an output current of the second current source is related to a magnitude of an input voltage of the power converter.

10. A method of generating a timing signal for a power converter, comprising:
   receiving an error signal related to an output voltage of the power converter;
   generating a threshold voltage by adding a predetermined voltage to the error signal; and
   generating a timing signal according to the error signal, the threshold voltage and a control signal and providing a tracking signal,
   wherein a voltage difference interval is formed between the error signal and the threshold voltage, and an upper margin of the voltage difference interval and a lower margin of the voltage difference interval vary with a change of the output voltage,
   wherein a timing generation unit provides a tracking signal and a change of the voltage difference interval, a time when the tracking signal departs from a level of the error signal to a level of the threshold voltage determines a width of the timing signal, and the width of the timing signal is adjusted according to the voltage difference interval and the tracking signal which are varied with the change of the output voltage.

11. The method according to claim 10, wherein in the step of generating the timing signal according to the error signal, the threshold voltage and the control signal comprising:
   the first comparator receiving the error signal and a ramp signal, wherein the control signal is a comparing result from a first comparator of the power converter.

12. The method according to claim 10, wherein the step of generating the threshold voltage according to the error signal comprises:
   generating the predetermined voltage by using a first current source and a resistor.

* * * * *